(12) United States Patent
Hegde et al.

(10) Patent No.: US 12,018,982 B2
(45) Date of Patent: Jun. 25, 2024

(54) AMBIENT RADIATION SENSING

(71) Applicant: ams International AG, Jona (CH)

(72) Inventors: Pradeep Hegde, Frisco, IN (US); Drew Paterson, Richardson, CA (US)

( * ) Notice: Subject to any disclaimer, the term of this patent is extended or adjusted under 35 U.S.C. 154(b) by 0 days.

(21) Appl. No.: 18/042,483

(22) PCT Filed: Aug. 20, 2021

(86) PCT No.: PCT/EP2021/073207
§ 371 (c)(1),
(2) Date: Feb. 22, 2023

(87) PCT Pub. No.: WO2022/043233
PCT Pub. Date: Mar. 3, 2022

(65) Prior Publication Data
US 2023/0324218 A1    Oct. 12, 2023

(30) Foreign Application Priority Data
Aug. 24, 2020   (GB) .................................... 2013181

(51) Int. Cl.
*G01J 1/42* (2006.01)
*G01J 1/04* (2006.01)

(52) U.S. Cl.
CPC ........... *G01J 1/4204* (2013.01); *G01J 1/0492* (2013.01)

(58) Field of Classification Search
CPC .............................. G01J 1/4204; G01J 1/0492
See application file for complete search history.

(56) References Cited

U.S. PATENT DOCUMENTS

2020/0056936 A1   2/2020   Lin
2020/0116836 A1*  4/2020   Pacala .................. G01J 1/4204

FOREIGN PATENT DOCUMENTS

WO       2020148451 A1    7/2020

OTHER PUBLICATIONS

International Preliminary Report on Patentability dated Feb. 28, 2023, PCT Application No. PCT/EP2021/073207, 9 pages.
International Search Report and Written Opinion dated Nov. 29, 2021, PCT Application No. PCT/EP2021/073207, 11 pages.

* cited by examiner

*Primary Examiner* — Thanh Luu
(74) *Attorney, Agent, or Firm* — MH2 TECHNOLOGY LAW GROUP LLP

(57) ABSTRACT

A radiation-sensitive device configured to determine an ambient radiation intensity is disclosed. The device includes at least one set of optical filters comprising: a first optical filter having a first passband spanning a portion of a spectrum associated with a radiation-emitting device and a portion of an ambient radiation spectrum; and a second optical filter having a second passband spanning a portion of the spectrum associated with the radiation-emitting device and a portion of the ambient radiation spectrum, the second passband different to the first passband. The device also includes processing circuitry configured to determine, from an intensity of incident radiation sensed using the first and second optical filters and based on the spectrum associated with the radiation-emitting device, a contribution of ambient radiation to the intensity of incident radiation sensed using the first and second optical filters.

14 Claims, 10 Drawing Sheets

AMBIENT RADIATION SENSING

CROSS-REFERENCE TO RELATED APPLICATIONS

This patent application is the national stage entry of International Patent Application No. PCT/EP2021/073207, filed on Aug. 20, 2021, and published as WO 2022/043233 A1 on Mar. 3, 2022, and claims priority to Great Britain patent application 2013181.9 filed on Aug. 24, 2020, the disclosures of all of which are hereby incorporated by reference in their entireties.

TECHNICAL FIELD OF THE DISCLOSURE

The present disclosure is in the field of optical devices, and particularly relates to ambient radiation sensing.

BACKGROUND

Radiation sensors are commonly used in portable devices such as cellular telephones, tablets and smartphones. Such devices typically have displays or screens, such as LED displays, for presenting information to a user. An effectiveness of such displays in presenting information to a user may be influenced by ambient radiation. For example, in bright environments characterised by a high degree of ambient radiation, it may be desirable to increase a brightness of the display to increase an overall perceptibility of displayed information. Similarly, in low light environments characterised by a low degree of ambient radiation, it may be desirable to decrease a brightness of the display to avoid irritation to a user's eyes.

Furthermore, the display of a portable device may account for a substantial proportion of the device's power consumption and overall battery-life. As such, optimising a brightness of a display based on a detected ambient radiation may help prolong a battery life of the portable device.

Radiation sensors may provide information about an ambient light level. A radiation sensor may generally be implemented on such portable devices to enable the portable device to adapt a brightness of a display in response to a detected ambient light level.

However, a recent trend in portable device design, and in particular in the design of smartphones, is to maximize a display area by reducing an area of a bezel. This may be achieved, at least in part, by positioning sensors such as radiation sensors and proximity sensors behind the display.

By mounting a sensor behind a display, a sensitivity of the sensor may be reduced due to a degree of opacity of the display. Furthermore, in some instances the display itself may emit radiation that may influence measurements of radiation by sensors disposed behind the display. That is, a radiation sensor disposed behind a display may detect both ambient radiation passing through the display and also radiation generated by the display itself. Current solutions to address this problem may comprise complex timing and synchronization of the display and the sensor to minimize the effects of such crosstalk. However, the effectiveness of such methods may be very dependent upon refresh characteristics of the display, may require complex circuitry, and may have limited accuracy.

It is therefore desirable to provide an effective, accurate and low-complexity ambient radiation sensing solution, suitable for disposal behind a display of a portable device. Furthermore, it is also desirable to provide a method of such ambient radiation sensing.

It is therefore an aim of at least one embodiment of at least one aspect of the present disclosure to obviate or at least mitigate at least one of the above identified shortcomings of the prior art.

SUMMARY

The present disclosure is in the field of optical devices, and in particular ambient radiation sensing. In particular, the present disclosure relates to a device, apparatus and associated method for discerning a contribution of ambient radiation from an overall sensed or detected level of radiation.

According to a first aspect of the present disclosure, there is provided a radiation-sensitive device for determining an ambient radiation intensity. The device comprises at least one set of optical filters comprising: a first optical filter having a first passband spanning a portion of a spectrum associated with a radiation-emitting device and a portion of an ambient radiation spectrum; and a second optical filter having a second passband spanning a portion of the spectrum associated with the radiation-emitting device and a portion of the ambient radiation spectrum, the second passband different to the first passband. The device also comprises processing circuitry configured to determine, from an intensity of incident radiation sensed using the first and second optical filters and based on the spectrum associated with the radiation-emitting device, a contribution of ambient radiation to the intensity of incident radiation sensed using the first and second optical filters.

Advantageously, by making a determination based upon an intensity of incident radiation sensed using the first and second optical filters and based on the spectrum associated with the radiation-emitting device, the device may be suitable for Behind Organic Light Emitting Diode (BOLED) applications, without requiring any synchronisation between the OLED display and a sensor implementing the first and second optical filters.

Furthermore, the determination may provide accurate results independent of whether such an OLED display is active, e.g. emitting radiation.

Advantageously, a radiation-sensitive device according the first aspect may provide a low-complexity and low-cost means suitable for controlling, e.g. directly or by providing an input to a controller, a brightness of a display in response to a determined contribution of ambient radiation to the intensity of incident radiation.

The ambient radiation intensity may correspond to an ambient lux, e.g. an amount of luminous flux per unit area.

In some embodiments, the ambient radiation intensity may correspond to an ambient intensity of radiation outside the visible spectrum. For example, the ambient radiation intensity may correspond to an intensity of ambient infrared radiation. As such, advantageously the disclosure according to the first aspect may additionally, or alternatively, be applicable to infrared proximity sensing applications, as described in more detail below.

The device may comprise a plurality of radiation-sensitive elements. For example, each radiation-sensitive element may be associated with a channel, e.g. a channel of the device.

In some embodiments, the first optical filter may be associated with a first radiation-sensitive element. That is, the first optical filter may filter radiation incident upon the first radiation-sensitive element. Similarly, the second optical filter may be associated with a second radiation-sensitive element.

The radiation-sensitive device may be an integrated device. For example, the first optical filter, the second optical filter and the processing circuitry, or at least a portion of the processing circuitry, may be integrated into a package, a module such as a multi-chip module, and/or provided as a monolithic device. Furthermore, the first radiation-sensitive element and the second radiation-sensitive element may be part of the integrated device.

The radiation-sensitive device may be provided as a distributed system. That is, at least a portion of the processing circuitry and/or storage such as one or more memory devices associated with the processing circuitry, may be located remote from the first optical filter, the second optical filter, and any associated radiation-sensitive elements. For example, at least a portion of the processing circuitry may be provided on one or more servers and/or cloud-based devices. At least a portion of the processing circuitry may be provided on a remote console or client device.

The processing circuitry may be configured to determine the contribution of ambient radiation to the intensity of incident radiation sensed using the first and second optical filters by solving the following simultaneous equations to determine 'a' and/or 'y':

$$O_{F1} = n_1 * a + Y_1 * y \quad \text{Equation (1)}$$

$$O_{F2} = n_2 * a + Y_2 * y \quad \text{Equation (2)}$$

wherein:
 a corresponds to an ambient radiation intensity per unit wavelength in the vicinity of the first and second passbands;
 y corresponds to an integral of the spectrum associated with the radiation-emitting device.
 $O_{F1}$ corresponds to radiation sensed using the first optical filter;
 $O_{F2}$ corresponds to radiation sensed using the second optical filter;
 $n_1$ corresponds to a wavelength-range of the first passband;
 $n_2$ corresponds to a wavelength-range of the second passband;
 $Y_1$ corresponds to a proportion of y corresponding to the first passband; and
 $Y_2$ corresponds to a proportion of y corresponding to the second passband.

Advantageously, by determining the ambient radiation intensity per unit wavelength in the vicinity of the first and second passbands, a more general estimation can be made of an overall amount of ambient radiation. That is, a determined ambient radiation intensity per unit wavelength in the vicinity of the first and second passbands can be scaled, extrapolated and/or interpolated to estimate or predict an amount of ambient radiation at wavelengths falling outside wavelengths in the vicinity of the first and second passbands.

Advantageously, by determining a value corresponding to an integral of the spectrum associated with the radiation-emitting device, an overall amount of radiation emitted by the radiation-emitting device may be estimated. For example, with knowledge of an emission spectrum associated with the radiation-emitting device, the value can be scaled to determine an overall emission of the radiation-emitting device.

Advantageously, by determining a value corresponding to an integral of the spectrum associated with the radiation-emitting device, a ratio of ambient light to emitted light may be determined. Such a ratio may be used to adjust a brightness of the radiation-emitting device(s) relative to the determined the ambient radiation intensity.

The radiation-sensitive device may comprise a third optical filter corresponding to a photopic luminosity function. The determination of the contribution of ambient radiation may comprise subtracting, from an intensity of incident radiation sensed using the third optical filter, a determined radiation contribution from the radiation-emitting device.

The photopic luminosity function may be a Commission Internationale de l'Éclairage (CIE) photopic luminosity function y(λ) or V(λ).

In some embodiments, the third optical filter may be associated with a third radiation-sensitive element. That is, the third optical filter may filter radiation incident upon the third radiation-sensitive element.

Advantageously, the use of the third optical filter corresponding to the photopic luminosity function may enable the device to sense a contaminated lux, e.g. an intensity of the ambient radiation in combination with an intensity of an emitted radiation, as perceived by the human eye. That is, the use of the third optical filter corresponding to the photopic luminosity function may enable the device to sense a total lux, e.g., a lux from ambient plus a lux from the radiation-emitting device.

Advantageously, an ambient radiation intensity, e.g. an ambient lux, as perceived by the human eye may be determined based on subtracting from the contaminated lux, a determined contribution from the radiation-emitting device.

The determined radiation contribution from the radiation-emitting device may correspond to a product of the photopic luminosity function and the spectrum associated with the radiation-emitting device.

The determined radiation contribution from the radiation-emitting device may correspond to a spectral overlap between the photopic luminosity function and the spectrum associated with the radiation-emitting device.

That is, the determined radiation contribution from the radiation-emitting device may correspond to an integration of the photopic luminosity function with the spectrum associated with the radiation-emitting device, e.g., a common area under both of the curves defined by the photopic luminosity function curve and the spectrum associated with the radiation-emitting device.

Advantageously, by corresponding the photopic luminosity function to the spectrum associated with the radiation-emitting device, the determined radiation contribution may correspond to a determined radiation contribution as perceived by the human eye.

The spectrum associated with the radiation-emitting device may be a predetermined or measured spectrum. For example, the spectrum associated with the radiation-emitting device may be determined during a calibration phase of the device. Similarly, the photopic luminosity function may be a predetermined photopic luminosity function or may correspond to the spectral sensitivity of the third optical filter.

The ambient lux may be calculated according to the following equations:

$$LUX_{amb} = LUX_{cont} - LUX_{device} \quad \text{Equation (3)}$$

$$LUX_{device} = y * LUX_{unit\_area\_radiation\_spectrum} \quad \text{Equation (4)}$$

wherein:
 $LUX_{amb}$ corresponds to the ambient lux, e.g. an ambient radiation intensity;

LUX$_{cont}$ corresponds to the contaminated lux, e.g. an intensity of the ambient radiation and radiation from the radiation emitting device;

y is a scaling factor as determined by solving the simultaneous Equations (1) and (2); and LUX$_{device}$ corresponds to a unit area radiation spectrum of the radiation-emitting device, scaled by the scaling factor 'y'.

A/the wavelength-range of the first passband may substantially overlap a/the wavelength-range of the second passband.

Advantageously, by having substantially overlapping wavelength-ranges, a spectrum of the ambient radiation may be assumed to be relatively linear in the wavelength ranges defined by the first and second passbands. As such, an error in the determined ambient radiation intensity may be minimised.

In some embodiments, the wavelength-range of the first passband may completely overlap the wavelength-range of the second passband.

The at least one set of optical filters may comprise at least one of: a set of filters associated with a green LED; a set of filters associated with a red LED; a set of filters associated with a blue LED; and/or a set of filters associated with an infrared radiation source.

Advantageously, such a set of optical filters may be applicable to an RGB display and/or an infrared proximity sensor, such as that implemented on a portable device, cellular telephone, tablet, smartphones, or the like.

The device may comprise a plurality of sets of optical filters, each set being associated with a different radiation-emitting device. The processing circuitry may be configured to determine the contribution of ambient radiation to the intensity of incident radiation sensed corresponding to each of the different radiation-emitting devices.

For example, the set of filters associated with the green LED of an RGB display may comprise a first optical filter passband spanning a portion of a spectrum associated with the green LED, a second optical filter having a second passband spanning a different portion of the spectrum associated with the green LED. A wavelength-range of the first passband may substantially overlap a wavelength-range of the second passband.

Similar arrangements of sets of filters for each of the red and blue LEDs of the RGB display may also be implemented.

Advantageously, such a device may be applicable to determining an intensity of ambient radiation in the presence of an RGB display. Furthermore such a device may be suited to Behind Organic Light Emitting Diode (BOLED) applications, wherein the device may be disposed behind the RGB display, and an ambient radiation detected by the device may be contaminated with radiation from the RGB display.

The ambient lux in the presence of red, green and blue LEDs, e.g. an RGB display, may be calculated according to the following equation:

$$LUX_{amb} = LUX_{cont\_RGB} - y_R * LUX_{LED\_unit\_area\_R} - y_G * LUX_{LED\_unit\_area\_G} - y_B * LUX_{LED\_unit\_area\_B} \quad \text{Equation (5)}$$

wherein:

LUX$_{amb}$ corresponds to the ambient lux, e.g. an ambient radiation intensity;

LUX$_{cont\_RGB}$ corresponds to the contaminated lux, e.g. an intensity of the ambient radiation and radiation from one or more red LEDs, green LEDs and blue LEDs;

y$_{R/G/B}$ corresponds to the integral of the spectrum associated with the red/green/blue LED, as determined by solving the simultaneous equations (1) and (2) for each of the red, green and blue LEDs, or as determined by directly measuring a spectrum associated with each LED, such as under laboratory conditions; and LUX$_{LED\_unit\_area\_R/G/B}$ may be determined in the laboratory environment, and may be the integration of the r/g/b_spectrum with unit area and photopic curve.

The determined ambient radiation intensity may be a visible and/or infrared ambient radiation intensity.

Advantageously, a device for determining an infrared ambient radiation intensity may be suitable for use in an infrared proximity sensor application. An infrared proximity sensor may comprise an infrared radiation-emitting device, and one or more infrared radiation-sensitive devices for sensing reflected infrared radiation from the infrared radiation-emitting device. The one or more radiation-sensitive devices may be associated with at least one set of optical filters. The at least one set of optical filters may comprise a first optical filter having a first passband spanning a portion of an spectrum associated with an infrared radiation-emitting device and a portion of an ambient infrared radiation spectrum. The at least one set of optical filters may also comprise a second optical filter having a second passband spanning a portion of the spectrum associated with the infrared radiation-emitting device and a portion of the ambient infrared radiation spectrum, the second passband different to the first passband. As such, by solving the simultaneous equations (1) and (2), to determine 'a', an ambient radiation intensity per unit wavelength in the vicinity of the first and second passbands may be determined. Furthermore the determined ambient radiation intensity per unit wavelength may be scaled, depending upon a particular wavelength-range of interest, such as a wavelength-range corresponding to a spectral sensitivity of the infrared radiation-sensitive device.

According to a second aspect of the disclosure, there is provided an apparatus comprising: a radiation-sensitive device according to any preceding claim; and at least one radiation-emitting device.

The apparatus may be a portable device, a cellular telephone, a tablet, a smartphone, or the like.

The at least one radiation-emitting device may form a component of an OLED display. The at least one radiation-emitting device may form a component of an RGB display. The at least one radiation-emitting device may be an LED. The radiation-sensitive device may be disposed behind the OLED display and configured to detect radiation through the OLED display.

The OLED display may comprise a red, a green and a blue OLED. The at least one radiation-sensitive device may comprise: a set of optical filters associated with the red LED; a set of optical filters associated with the green LED; and a set of optical filters associated with the blue LED.

The apparatus may comprise a camera, wherein the processing circuitry is configured to white-balance and/or adjust a brightness of an image captured by the camera based at least in part upon a determined ambient radiation intensity.

According to a third aspect of the present disclosure, there is provided a proximity sensor comprising: a radiation-sensitive device according to the first aspect, and at least one infrared radiation-emitting device.

In some embodiments, the radiation-sensitive device and the infrared radiation-emitting device may be integrated into a single component, device and/or package.

According to a fourth aspect of the present disclosure, there is provided a cellular telephone, a smartphone, a tablet device, a laptop, or a portable device comprising the apparatus according to the second aspect and/or the proximity sensor according to the third aspect.

According to a fifth aspect of the present disclosure, there is provided a method of determining an ambient radiation intensity, the method comprising: sensing an incident radiation using a first optical filter having a first passband spanning a portion of a spectrum associated with a radiation-emitting device and a portion of an ambient radiation spectrum; sensing the incident radiation using a second optical filter having a second passband spanning a portion of the spectrum associated with the radiation-emitting device and a portion of the ambient radiation spectrum, the second passband different to the first passband; and determining, from an intensity of incident radiation sensed using the first and second optical filters and based on the spectrum associated with the radiation-emitting device, a contribution of ambient radiation to the intensity of incident radiation sensed using the first and second optical filters.

Determining the contribution of ambient radiation to the intensity of incident radiation sensed using the first and second optical filters may comprise solving equations (1) and (2) to determine 'a' and/or 'y'.

The method may comprise sensing an incident radiation using a plurality of different sets of optical filters, wherein each set comprises first and second optical filters as described above. Each set may correspond to a different wavelength range. For example, a first set may be selected to substantially correspond to a spectrum associated with a red LED, a second set may be selected to substantially correspond to a spectrum associated with a green LED, and a third set may be selected to substantially correspond to a spectrum associated with a blue LED.

The method of determining the ambient radiation intensity may comprise determining the contribution of ambient radiation to the intensity of incident radiation by solving equations (1) and (2) to determine 'a' and/or 'y' for each set of the plurality of different sets of optical filters. Furthermore, a weighted sum of the calculated ambient radiation intensity per unit wavelength for each set optical filters may be calculated.

Calculating the weighted sum may comprise weighting, or scaling, each of the calculated ambient radiation intensities per unit wavelength by a scaling-factor. Each scaling-factor may be a lux coefficient. Each lux coefficient may be a predetermined coefficient. For example, each lux coefficient may be calculated or determined under laboratory conditions.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF THE PREFERRED EMBODIMENTS

These and other aspects of the present disclosure will now be described, by way of example only, with reference to the accompanying drawings, wherein.

DETAILED DESCRIPTION OF THE PREFERRED EMBODIMENTS

Figure 1:
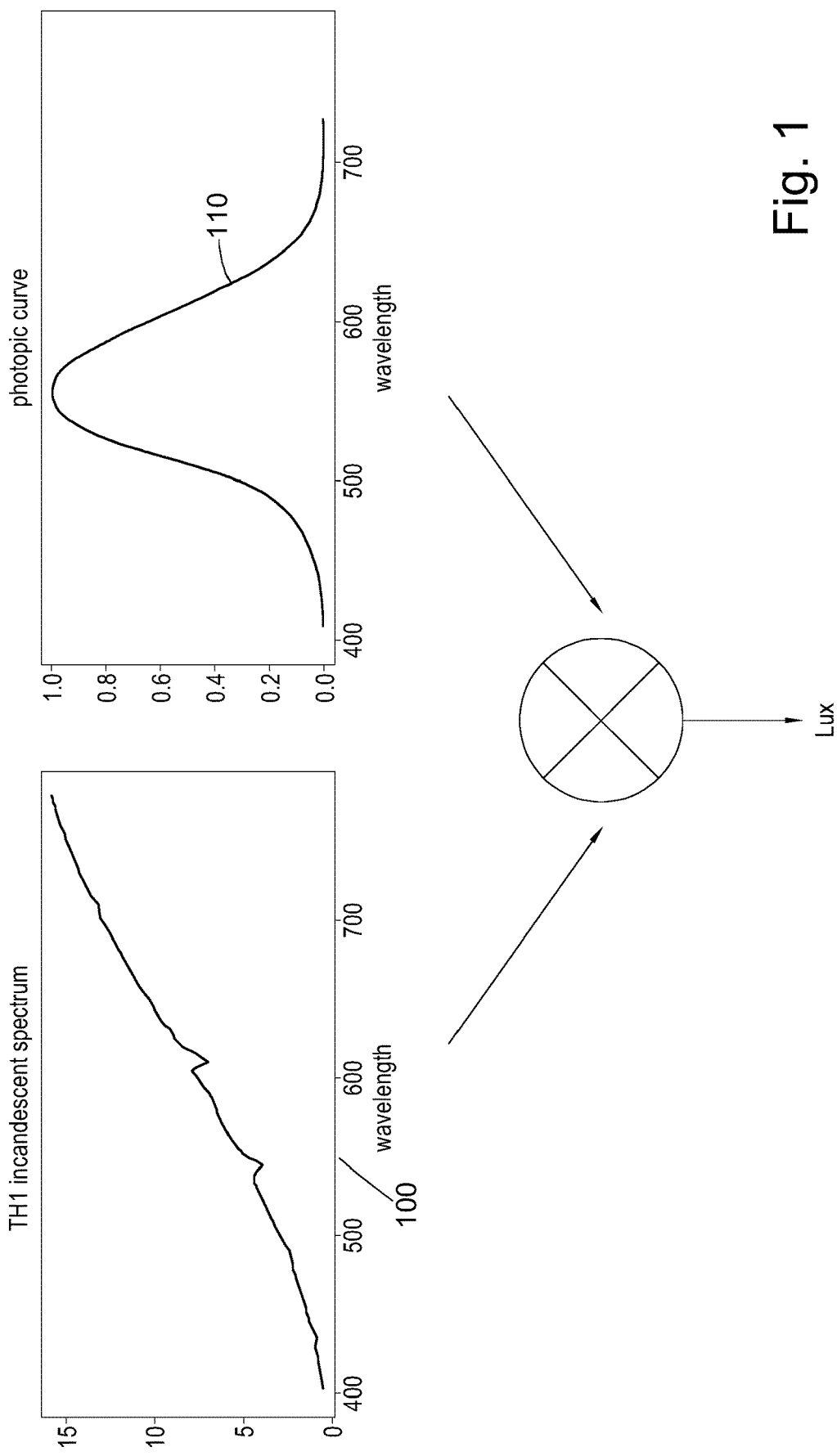
FIG. 1 depicts a prior art method of ambient light measurement.

FIG. 1 depicts an example of a prior art method of ambient radiation measurement. In the example of FIG. 1, an ambient radiation spectrum 100 associated with an incandescent ambient radiation source, denoted 'TH1', is depicted. It will be appreciated that an incandescent ambient radiation source is used for purposes of example only, and the described method is applicable to other ambient radiation sources, which may for example comprise one or a combination of: an incandescent light; sunlight; a fluorescent light; a halogen light; one or more LED lights; or the like.

In the method depicted in FIG. 1, the ambient radiation spectrum 100 may be sensed using a sensor that is sensitive to radiation in a visible light range, e.g. between approximately 400 nm and 700 nm.

A photopic curve 110 is also depicted. The photopic curve 110 corresponds to a luminosity function describing an average or typical spectral sensitivity of a human visual perception of brightness. The photopic curve may correspond to the CIE photopic luminosity function $y(\lambda)$ or $V(\lambda)$.

In some examples, the sensor may comprises an optical filter, such as an interference filter, with passband characteristics corresponding to the photopic curve 110. As such, a sensed ambient radiation may correspond to an ambient lux, e.g. ambient radiation as perceived by the human eye.

In other examples the sensor may be configured to sense at least a substantial portion of the visible light range, and a subsequent processing operation may be performed upon the sensed ambient radiation spectrum 100. That is a function corresponding to the photopic curve 110 may be stored, such as in a memory of a processing device, and used to calculate the ambient lux using the sensed ambient radiation spectrum 100. For example, the ambient lux may be calculated from an integral of the product of the photopic curve 110 and the sensed ambient radiation spectrum 100.

Figure 2:
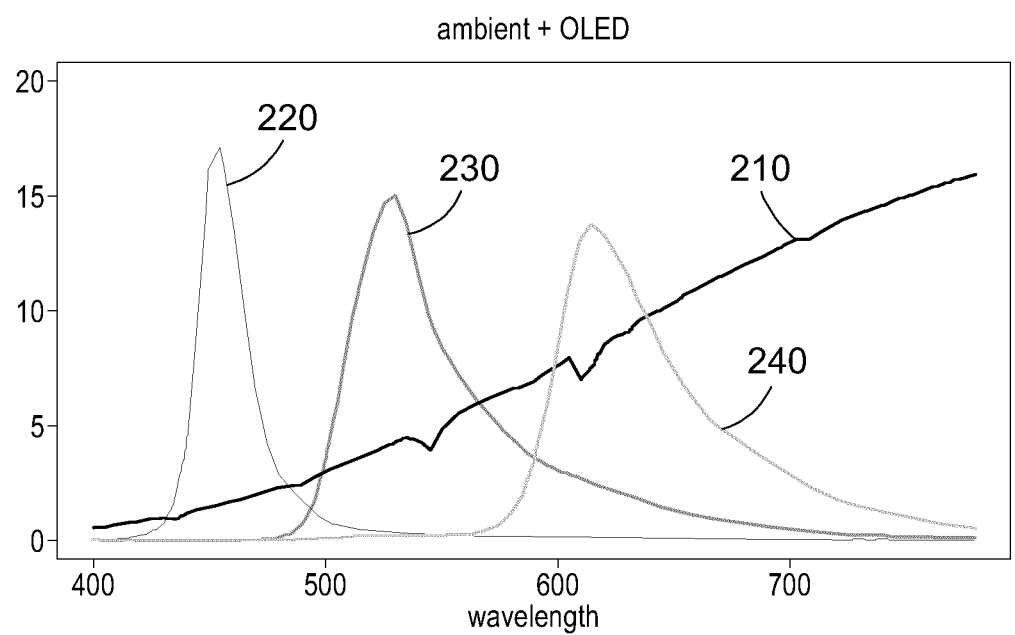
FIG. 2 depicts spectra associated with ambient light and an RGB display.

FIG. 2 depicts spectra associated with ambient radiation and an RGB display. Again, for purposes of example, the ambient radiation spectrum 210 of an incandescent light source is shown. Also depicted is a first spectrum 220 associated with a blue LED, e.g. indicative of radiation emitted by a blue LED, a second spectrum 230 associated with a green LED and a third spectrum 240 associated with a red LED. The first, second and third spectra 220, 230, 240 may correspond to radiation from an RGB display, such as an OLED RGB display that may be implemented on a portable device, cellular telephone, tablet, smartphone, television, or the like.

Figure 3:
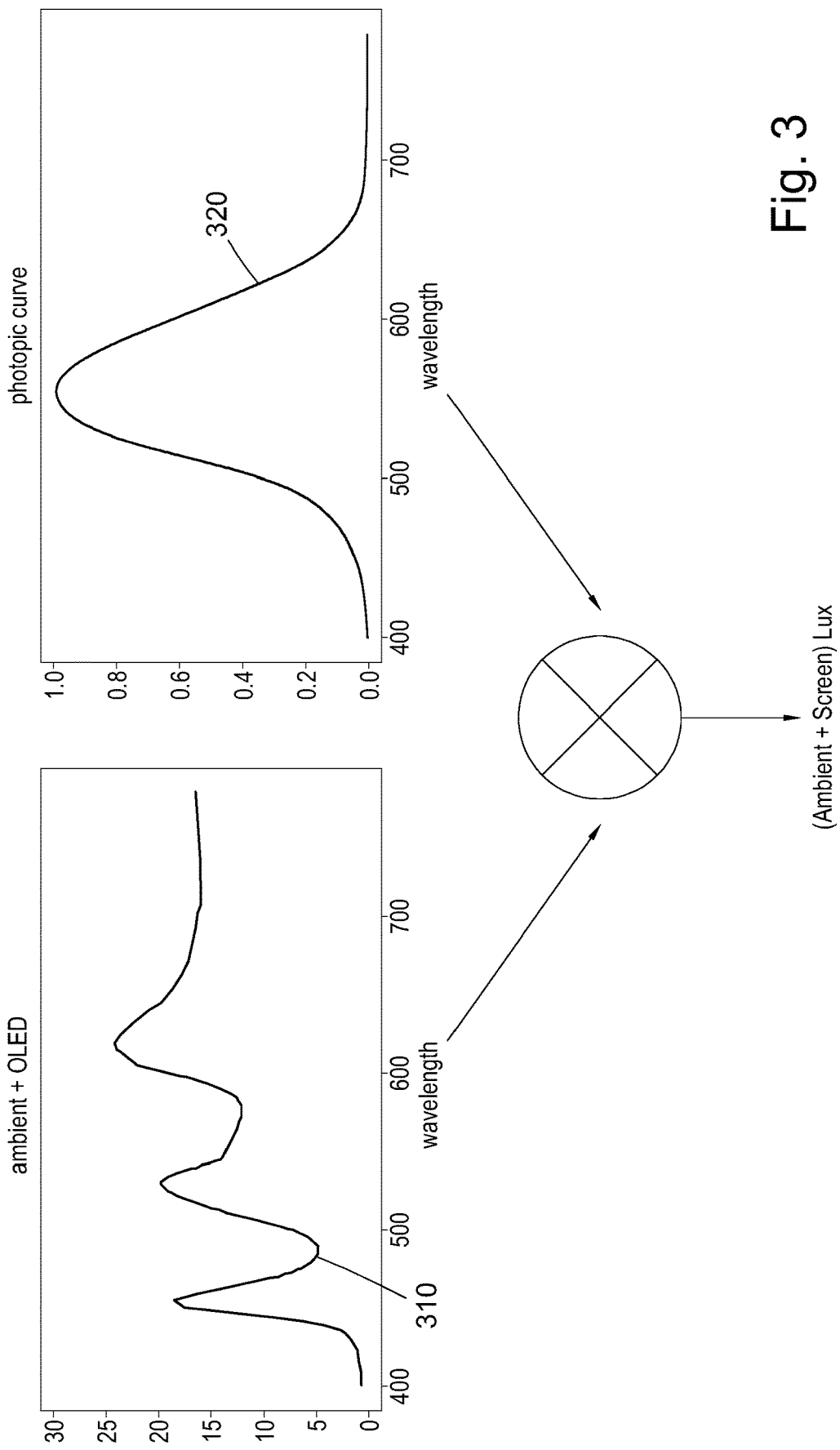
FIG. 3 depicts a method of lux measurement of the ambient light and the RGB display.

FIG. 3 depicts a method of lux measurement of the ambient radiation and radiation from such an RGB display. A spectrum 310 shows the combined radiation, e.g. a linear sum of the radiation, from an RGB display and an incandescent ambient radiation source. That is, the first spectrum 220, the second spectrum 230, the third spectrum 240 and the ambient radiation spectrum 210 as depicted in FIG. 2 may combined by addition to provide the spectrum 310 depicted in FIG. 3.

As such, application of the methods described above in relation to FIG. 1, e.g. by integrating a product of a photopic curve 320 and the spectrum 310, may be performed to determine a lux value corresponding to a combination of the ambient radiation and also radiation emitted by the RGB display.

However, when sensing an ambient radiation it may be desirable to separate a lux contribution from the ambient radiation source from a lux contribution from the RGB display. For example, in BOLED applications, where an ambient radiation sensor may be disposed behind the display, it may be desirable to be able to evaluate an ambient radiation intensity without the effects of any such ambient radiation measurements being contaminated by radiation from the OLED display itself.

Figure 4:
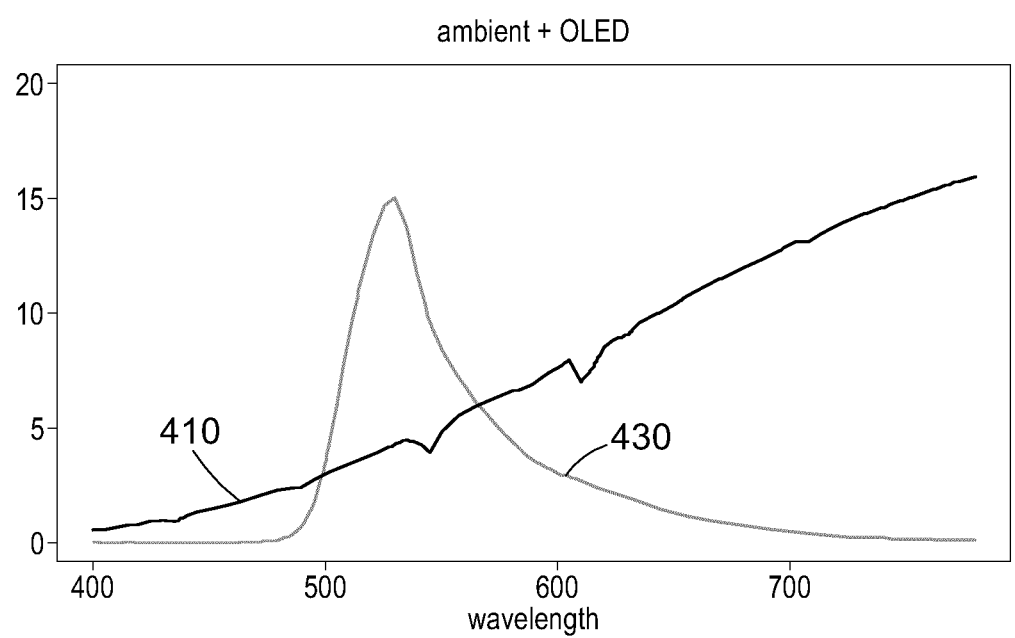
FIG. 4 depicts spectra associated with ambient light and a green LED.

For purposes of example and simplicity, the following methods and devices for determining an ambient radiation intensity are described with reference to an incandescent radiation spectrum 410 and a green LED spectrum 430, e.g. a spectrum associated with a green LED, as shown in FIG. 4. It will be appreciated that the ensuing methods and devices are also applicable to other radiation sources, such as additional red and blue LEDs and different or additional ambient light sources. The spectrum 430 associated with the green LED has been selected for purposes of example only because the spectrum 430 generally overlaps the photopic curve more than the first spectrum 220 associated with a blue LED and the third spectrum 240 associated with a red LED, and therefore the green LED may generally have the greatest contaminating effect upon an ambient light measurement.

The disclosed methods and devices use a combination of optical filter sets to estimate the ambient intensity and/or the display intensity. In particular, the disclosed methods and devices leverage the fact that radiation intensities may be linearly added, as depicted in FIG. 3 wherein the spectrum 310 shows the combined radiation, e.g. a linear sum, from the RGB display and an incandescent light source.

The disclosed methods and devices use a combination of optical filter sets to derive different linear mixtures of similar combinations of ambient radiation and radiation from a display.

In particular, the disclosed methods and devices employ linear algebra to decouple ambient radiation from radiation from a radiation-emitting device, such as an RGB LED display.

As described in more detail below, the disclosed methods and devices take advantage of a prior knowledge of a spectrum of the radiation-emitting devices of a display, e.g., the first spectrum 220 associated with a blue LED, the second spectrum 230 associated with a green LED and/or the third spectrum 240 associated with a red LED, to help determine filter passband positions and ranges.

Figure 5A:
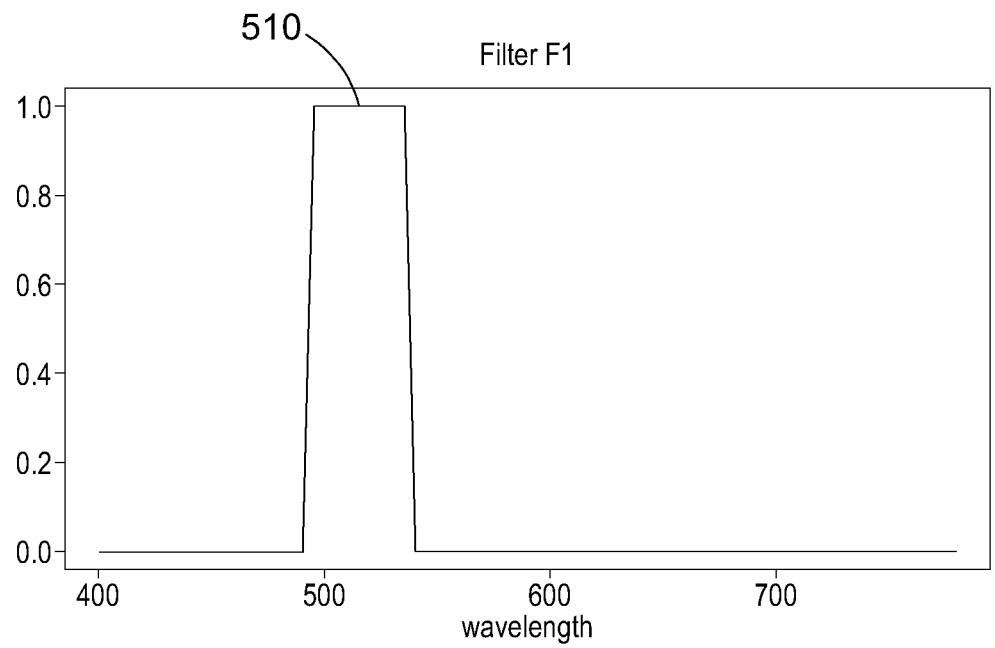
FIG. 5a depicts a passband associated with a first optical filter.
Figure 6A:
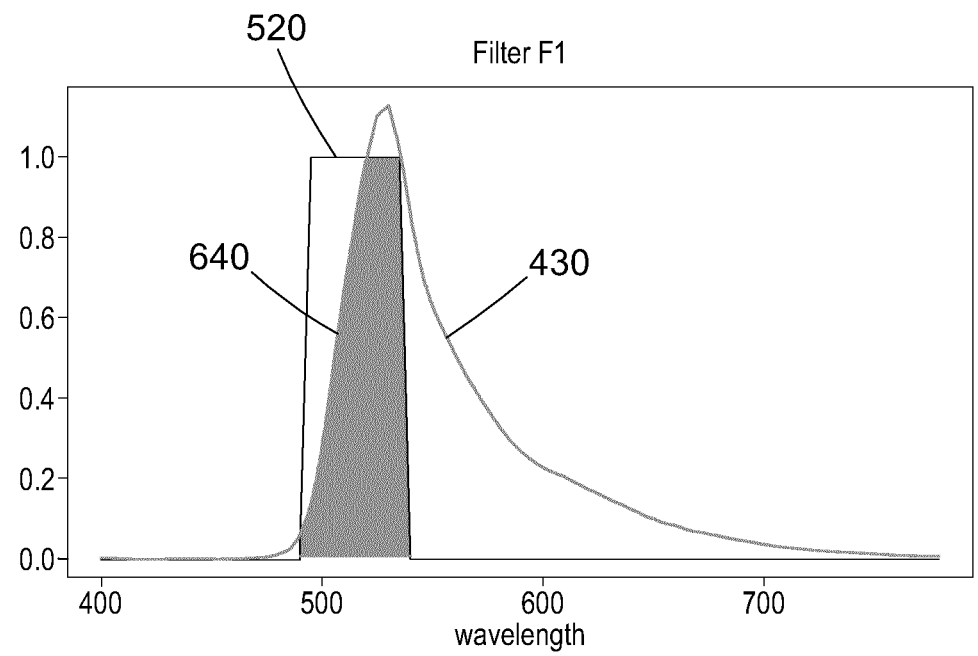
FIG. 6a depicts the passband associated with the first optical filter and a spectrum associated with the green LED.

According to an embodiment of the disclosure, FIG. 5*a* depicts a first passband 510 associated with a first optical filter. The first passband 510 spans a portion of a spectrum associated with a radiation-emitting device, e.g. the green LED, and a portion of an ambient radiation spectrum. In the example of FIG. 5*a*, the first passband 510 extends from approximately 492.5 nm to approximately 537.5 nm. As such, the first passband 510 extends over a portion of the incandescent radiation spectrum 410 and the green LED spectrum 430, as shown in FIG. 6*a*.

Figure 5B:
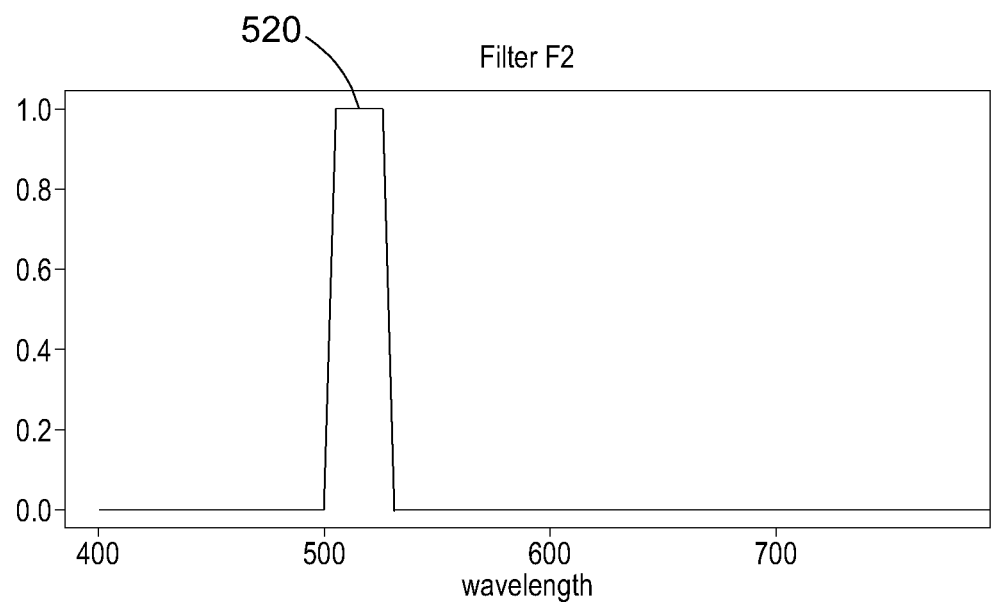
FIG. 5b depicts a passband associated with a second optical filter.
Figure 6B:
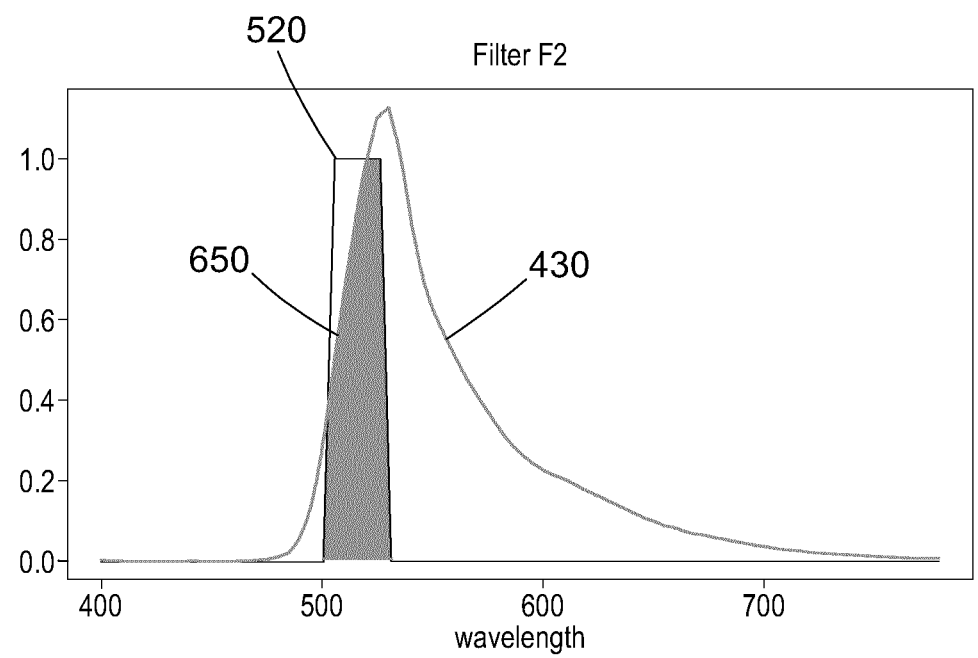
FIG. 6b depicts the passband associated with the second optical filter and the spectrum associated with the green LED.

FIG. 5*b* depicts a second passband 520 associated with a second optical filter. The second passband 520 also spans a portion of the spectrum associated with a radiation-emitting device, e.g. the green LED, and a portion of the ambient radiation spectrum. In the example of FIG. 5*b*, the second passband 520 extends from approximately 502.5 nm to approximately 527.5 nm. As such, the second passband 520 also extends over a portion of the incandescent radiation spectrum 410 and the green LED spectrum 430, as shown in FIG. 6*b*.

Together, the first optical filter having first passband 510 and the second optical filter having second passband 520 form a set of optical filters.

Notably, the second passband 520 is different to the first passband 510. That is, the first optical filter may be configured to sense a different combination of the incandescent radiation spectrum 410 and the green LED spectrum 430, in comparison to the second optical filter. While the first and second filters have respective first and second passbands 510, 520 corresponding to different portions of the green LED spectrum 430, the first passband 510 and second passband 520 correspond to similar portions of the ambient light spectrum. In some embodiments the first passband 510 may substantially overlap the second passband 520. That is, a wavelength-range of the first passband 510 may substantially overlap a wavelength-range of the second passband 520. Advantageously, by having substantially overlapping wavelength-ranges, a spectrum of the ambient radiation may be assumed to be relatively linear within the wavelength ranges defined by the first and second passbands 510, 520. As such, an error in the determined ambient radiation intensity may be minimised. The ambient radiation intensity may correspond to an ambient lux, e.g. an amount of luminous flux per unit area.

In some embodiments, the wavelength-range of the first passband 510 may completely overlap the wavelength-range of the second passband 520.

In some embodiments, a device implementing such first and second optical filters may also comprise processing circuitry configured to determine, from an intensity of incident radiation sensed using the first and second optical filters and based on a spectrum associated with the radiation-emitting device, e.g., the green LED spectrum, a contribution of ambient radiation to the intensity of incident radiation sensed using the first and second optical filters.

Beneficially, by making a determination based upon an intensity of incident radiation sensed using the first and second optical filters and based on the spectrum associated with the radiation-emitting device, the device may be suitable for BOLED applications, without requiring any synchronisation between the OLED display and a sensor implementing the first and second optical filters.

Continuing with the above example, an output of the first optical filter and the second optical filter, e.g. data corresponding to radiation sensed by a device implementing such first and second filters, may be defined by the above-mentioned Equation (1) and Equation (2). As such, continuing with the above example of FIGS. 6a and 6b, an output of the first and second optical filters may be defined by:

$$O_{F1}=9*a+0.4417028*y \quad \text{Equation (6)}$$

$$O_{F2}=5*a+0.2714456*y \quad \text{Equation (7)}$$

wherein
'a' corresponds to an ambient radiation intensity per 5 nm in the vicinity of the first passband 510 and second passband 520;
'y' corresponds to an integral of the spectrum 430 associated with a green LED;
$O_{F1}$ corresponds to radiation sensed using the first optical filter; and
$O_{F2}$ corresponds to radiation sensed using the second optical filter.

In Equation (6), the proportion of the spectrum 430 that corresponds to the first passband 510 is 0.4417028, and is depicted as a first shaded area 640 in FIG. 6a. Similarly, in Equation (6), the proportion of the spectrum 430 that corresponds to the second passband 520 is 0.2714456, and is depicted as a second shaded area 650 in FIG. 6b.

By means of example, for an experiment implementing the above-described set of filters exposed to a green LED and an incandescent ambient radiation source, a lux measurement of radiation sensed using the first optical filter, $O_{F1}$, was 396.0263 lux and a lux measurement of radiation sensed using the second optical filter, $O_{F2}$, was 241.5154 lux.

In this example embodiment, the simultaneous equations (6) and (7) can therefore be solved to determine parameters 'a' and 'y'. For example, in some embodiments the simultaneous equations (6) and (7) may be solved as a matrix operation, wherein:

$$\begin{bmatrix} a \\ y \end{bmatrix} = \begin{bmatrix} 9 & 0.4417028 \\ 5 & 0.2714456 \end{bmatrix}^{-1} \times \begin{bmatrix} 396.0263 \\ 241.5154 \end{bmatrix}$$

In this example embodiment, a=3.503554. That is, an ambient radiation intensity in the vicinity of the first passband 510 and second passband 520 is 3.503554 lux per nm.

In this example embodiment, y=825.202634. That is, a total integral of the green LED spectrum 430 is 825.202634. This is representative of a total lux from the green LED.

In use, knowledge of parameters 'a' and 'y' may be used in several different ways, for example to determine information pertaining to an ambient radiation intensity, to determine a display intensity or brightness, and/or to determine characteristics of an ambient light source.

For example, in some embodiments a 'contaminated lux' measurement may be made, wherein contaminated lux represents a measurement of ambient radiation contaminated with radiation from a radiation-emitting device. In some embodiments, such a measurement may be made with a photopic filter, such that radiation sensed corresponds to radiation as perceived by the human eye.

In some embodiments, such a measurement may be made without using a photopic filter, for example by a spectral sensor with a spectral sensitivity that substantially spans a visible light range. In such embodiments, data corresponding to the sensed radiation may be processed using a photopic curve, such as a photopic curve stored in a memory of a processing device, to adapt the sensed data to substantially correspond to radiation as would be perceived by the human eye.

Continuing with the above example of an ambient radiation source corresponding to an incandescent light and a radiation-emitting device corresponding to a green LED, in a practical experiment a contaminated lux measurement made using a photopic filter was measured at 703.5435 Lux.

In some embodiments, a scaling-factor corresponding to a lux contribution from the green LED may be may be determined during a calibration phase, or in a manufacturing phase, such as under laboratory conditions.

The scaling factor may correspond to a lux contribution of a unit OLED signal. In the present example, the scaling factor may correspond to a lux contribution of the green LED. That is, a signal corresponding to the spectrum from the green LED, normalised such that a total area under the spectrum is one unit, and then scaled according to the photopic luminosity function.

That is, in some embodiments a determined lux contribution from the green LED may correspond to a product of the photopic luminosity function and a spectrum or normalized/unit spectrum associated with the green LED. In some embodiments, the determined radiation contribution from the green LED may correspond to a spectral overlap between the photopic luminosity function and a spectrum or normalized/unit spectrum associated with the green LED.

In some embodiments, the determined radiation contribution from the green LED may correspond to an integration of the photopic luminosity function with the spectrum associated with the green LED, e.g., a common area under both of the curves defined by the photopic luminosity function curve and the spectrum associated with the green LED.

In this example, the scaling-factor corresponding to a lux contribution from the green LED was determined to be 0.7117874. As such, the ambient lux may be calculated according to the above-described Equation (3). That is, in this instance $LUX_{amb}$, which corresponds to the ambient lux, was determined to be: 703.5435−825.202634*0.7117874=116.1747 Lux. In experimentals, this closely corresponded with an actual measurement of the ambient lux made in the absence of the green LED.

Although the above-described devices and methods have been described by means of an example using a green LED, it will be appreciated that the approach may be extended to include other or additional radiation-emitting devices, as described above with reference to Equation (5). For example, in some embodiments such a device may be disposed behind an RGB display, wherein an ambient radiation measurement may be contaminated by radiation from at least one or more red, green and/or blue LEDs. As such, the device may implement a plurality of sets of filters. That is, some embodiments may comprise sensing an incident radiation using a plurality of different sets of optical filters, wherein each set comprises first and second optical filters as described above. Each set may correspond to a different wavelength range. For example, a first set may be selected to substantially correspond to a spectrum associated with a red LED, a second set may be selected to substantially correspond to a spectrum associated with a green LED, and a third set may be selected to substantially correspond to a spectrum associated with a blue LED. Such a device is described in more detail below with reference to FIG. 8.

In some embodiments, a determination of the ambient radiation intensity may comprise determining the contribution of ambient radiation to the intensity of incident radiation by solving equations (1) and (2) to determine 'a' and/or 'y' for each set of the plurality of different sets of optical filters. Furthermore, a weighted sum of the calculated ambient radiation intensity per unit wavelength for each set optical filters may be calculated. This is depicted in FIG. 7a, which for purposes of example shows passbands 710, 730, 750 associated with a plurality of optical filters, spectra 720, 740, 760 associated with a plurality of radiation sources, and an ambient radiation spectrum 770.

Figure 7A:
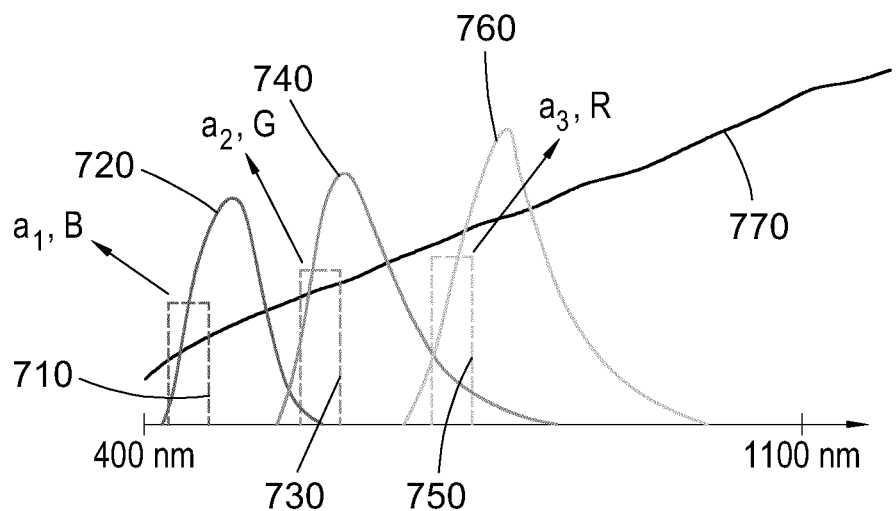
FIG. 7a depicts passbands associated with a plurality of optical filters, spectra associated with a plurality of radiation sources, and an ambient light spectrum.

In the example of FIG. 7a, a first set of optical filters have passbands 710 at around approximately 450 nm, which substantially overlaps a portion of a spectrum 720 associated with a blue LED. A second set of optical filters have passbands 730 at around approximately 520 nm, which substantially overlaps a portion of a spectrum 740 associated with a green LED. A third set of optical filters have passbands 750 at around approximately 620 nm, which substantially overlaps a portion of a spectrum 760 associated with a red LED. By applying the above methodology, and solving Equation (1) and Equation (2) for each of the first, second and third sets of optical filters, parameters 'a' and 'y' may be calculated for each set of filters. As shown in FIG. 7a, the parameters 'a' and 'y' are denoted: '$a_1$, B' for the first set of filters having passbands 710 corresponding to the blue LED; '$a_2$, G' for the second set of filters having passbands 730 corresponding to the green LED; and '$a_3$, R' for the third set of filters having passbands 750 corresponding to the red LED.

In some embodiments, a weighted sum of the determined parameters $a_1$, $a_2$ and $a_3$ may be used to determine a total ambient lux. For example, calculating the weighted sum may comprise weighting, or scaling, each of $a_1$, $a_2$, $a_3$ by a scaling-factor. Each scaling-factor may be a lux coefficient. That is, the ambient lux may be determined by Equation (7):

$$LUX_{amb} = LUX_{COEFF1}*a1 + LUX_{COEFF2}*a2 + LUX_{COEFF3}*a3 \quad \text{Equation (8)}$$

wherein:
$LUX_{amb}$ corresponds to the ambient lux, e.g. an ambient radiation intensity;
$LUX_{COEFF1/2/3}$ corresponds to a predetermined Lux coefficient; and
$a_{1/2/3}$ corresponds an ambient radiation intensity per unit wavelength in the vicinity of the passbands of the corresponding filter set.

Each lux coefficient, $LUX_{COEFF1/2/3}$, may be a predetermined coefficient. For example, each lux coefficient may be calculated or determined under laboratory conditions. Each lux coefficient may correspond to a particular wavelength or range of wavelengths. For example, $LUX_{COEFF1}$ may correspond to a range of wavelengths spanning a spectrum associated with a blue LED, $LUX_{COEFF2}$ may correspond to a range of wavelengths spanning a spectrum associated with a green LED, and $LUX_{COEFF3}$ may correspond to a range of wavelengths spanning a spectrum associated with a red LED.

Figure 7B:
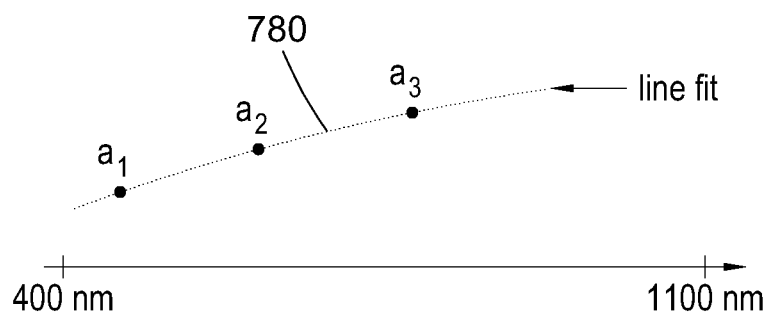
FIG. 7b depicts a method of determining an ambient radiation intensity from a weighted sum of the calculated ambient radiation intensities per unit wavelength.

In some embodiments, the determined parameters $a_1$, $a_2$ and $a_3$ may be plotted, as shown in FIG. 7b, wherein each parameter a1, a2, a3 corresponds to an ambient radiation intensity per unit wavelength in the vicinity of the passbands of the associated filter set. In some embodiments, a line 780 may be fitted to points defined by each parameter a1, a2, a3, wherein the line may be used to identify an ambient radiation source. That is a shape or other features of the line may correspond to characteristics of a known ambient radiation source, such as an incandescent light, sunlight, a fluorescent light, a halogen light, one or more LED lights, or the like.

In some embodiments, the determined parameters $a_1$, $a_2$ and $a_3$ may be plotted, as shown in FIG. 7b, wherein the resultant line 720 is integrated with a photopic curve, e.g. the photopic curve 320 depicted in FIG. 3, to determine the ambient lux.

Figure 8:
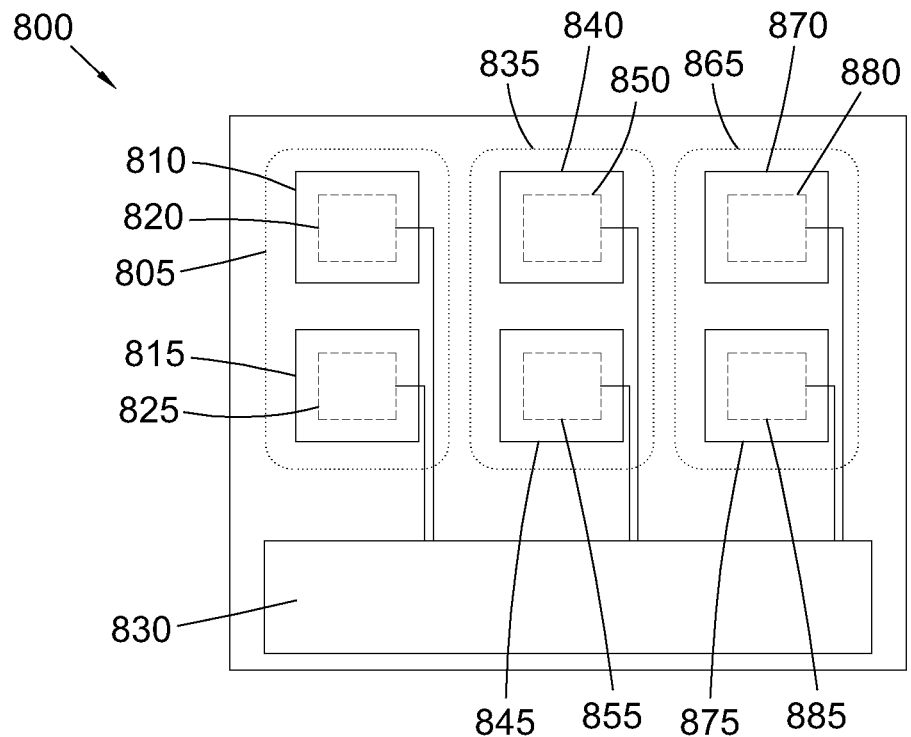
FIG. 8 depicts a radiation-sensitive device according to an embodiment of the disclosure.

FIG. 8 depicts a radiation-sensitive device 800 according to an embodiment of the disclosure. The radiation-sensitive device 800 comprises a first set of optical filters 805 comprising: a first optical filter 810 having a first passband spanning a portion of a spectrum associated with a radiation-emitting device and a portion of an ambient radiation spectrum; and a second optical filter 815 having a second passband spanning a portion of the spectrum associated with the radiation-emitting device and a portion of the ambient radiation spectrum, the second passband different to the first passband. In an example embodiment, the first optical filter 810 and second optical filter 815 may be implemented as interference filters.

The first optical filter 810 of the first set of optical filters 805 is associated with a first radiation-sensitive element 820. In an example embodiment, the first radiation-sensitive element 820 may comprise one or more photodiodes.

The first optical filter 810 filters incident radiation, such that the first radiation-sensitive element 820 receives filtered radiation. In one example embodiment, the passband of the first optical filter 810 corresponds to a portion of a spectrum of a blue LED, e.g. spectrum 220. That is, the passband of the first optical filter 810 of the first set of optical filters 805 is configured to have a passband substantially overlapping a spectrum of the radiation-emitting device, wherein the radiation-emitting device is in this example embodiment a blue LED.

The second optical filter 815 of the first set of optical filters 805 is associated with a second radiation-sensitive element 825. The second radiation-sensitive element 825 may comprise one or more photodiodes.

The second optical filter 815 filters radiation, such that the second radiation-sensitive element 825 receives filtered radiation. In one example embodiment, the passband of the second optical filter 815 in this example embodiment also corresponds to a portion of a spectrum of the blue LED. That is, the passband of the second optical filter 815 of the first set of optical filters 805 is also configured to have a passband substantially overlapping a spectrum of the radiation-emitting device, wherein the radiation-emitting device is a blue LED, and wherein the passbands of the first and second optical filters 810, 815 are different.

The radiation-sensitive device 800 also comprises processing circuitry 830 configured to determine, from an intensity of incident radiation sensed using the first and second optical filters 810, 815 and based on the spectrum associated with the radiation-emitting device, e.g. the red LED, a contribution of ambient radiation to the intensity of incident radiation sensed using the first and second optical filters 810, 815.

The first radiation-sensitive element 820 and the second radiation-sensitive element 825 are coupled to the processing circuitry 830. As such, the processing circuitry 830 may receive data and/or a signal corresponding to radiation sensed by each of the first radiation-sensitive element 820 and the second radiation-sensitive element 825.

In the example embodiment of FIG. 8, the radiation-sensitive device 800 also comprises a second set of optical filters 835 comprising a third optical filter 840 associated with a third radiation-sensitive element 850, and a fourth optical filter 845 associated with a fourth radiation-sensitive element 855. In this example embodiment the second set of optical filters 835 is associated with a green LED. The third radiation-sensitive element 850 and the fourth radiation-sensitive element 855 are also coupled to the processing circuitry 830. As such, the processing circuitry 830 may receive data and/or a signal corresponding to radiation sensed by each of the third radiation-sensitive element 850 and the fourth radiation-sensitive element 855.

In the example embodiment of FIG. 8, the radiation-sensitive device 800 also comprises a third set of optical filters 865 comprising a fifth optical filter 870 associated with a fifth radiation-sensitive element 880, and a sixth optical filter 875 associated with a sixth radiation-sensitive element 885. In this example embodiment the third set of optical filters 835 is associated with a red LED. The fifth radiation-sensitive element 880 and the sixth radiation-sensitive element 885 are also coupled to the processing circuitry 830. As such, the processing circuitry 830 may receive data and/or a signal corresponding to radiation sensed by each of the fifth radiation-sensitive element 880 and the sixth radiation-sensitive element 885.

The processing circuitry 830 may also be configured to determine the contribution of ambient radiation to the intensity of incident radiation sensed using each of the first set of optical filters 805, the second set of optical filters 835 and the third set of optical filters 865 by solving the equations (1) and (2) to determine 'a' and/or 'y' for each set of filters.

As such, the example radiation-sensitive device 800 may be used to provide data as illustrated in FIG. 7b, wherein an ambient radiation intensity per unit wavelength in the vicinity of the passbands of each of the first, second and third filter sets.

Advantageously, such a device may be suitable for determining an ambient radiation intensity when a detected ambient radiation is contaminated with radiation from an RGB display. Therefore, such as device may be particularly suited towards BOLED applications.

It will be appreciated that the radiation-sensitive device 800 is provided for purposes of example only, and other embodiments may comprise less than or greater than three sets of filters.

Figure 10:
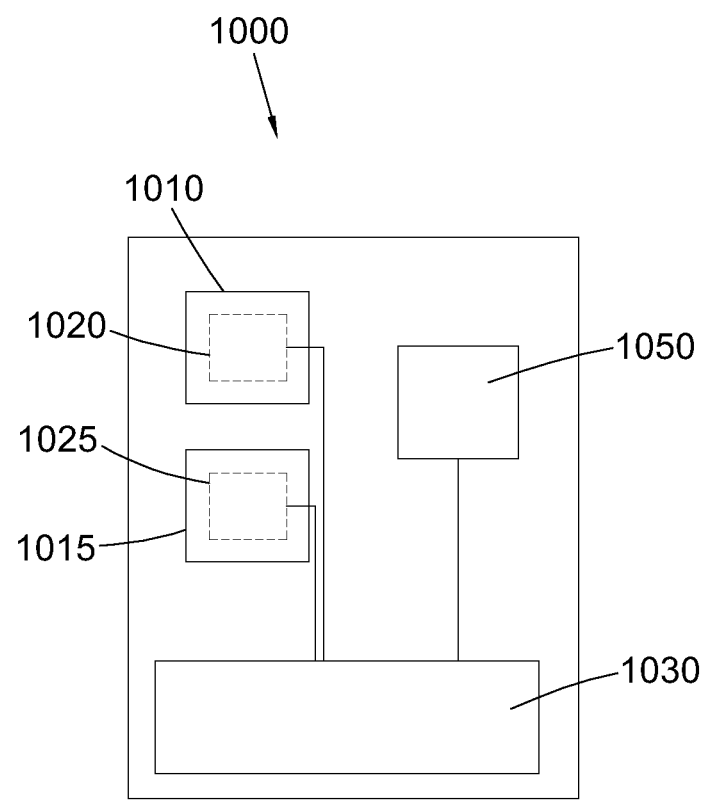
FIG. 10 depicts a proximity sensor according to an embodiment of the disclosure.

Furthermore, other embodiments may additional or alternatively comprise filters having passbands in an infrared range, as described in more detail below with regard to FIG. 10.

In some embodiments the radiation-sensitive elements may be integrated into the radiation-sensitive device 800. In some embodiments interference filters, such as the above-described first to sixth optical filters 810, 815, 840, 845, 870, 875, may be formed directly on the radiation-sensitive elements. In some embodiments, such interference filters may form a component of a package or module comprising the radiation-sensitive elements. In some embodiments, such interference filters may be formed on or coupled to the display, e.g. a rear surface of the display. In some embodiments, the radiation-sensitive device 800 may comprise additional radiation-sensitive elements, for spectral sensing, proximity sensing, light sensing, and/or other purposes.

Figure 9:
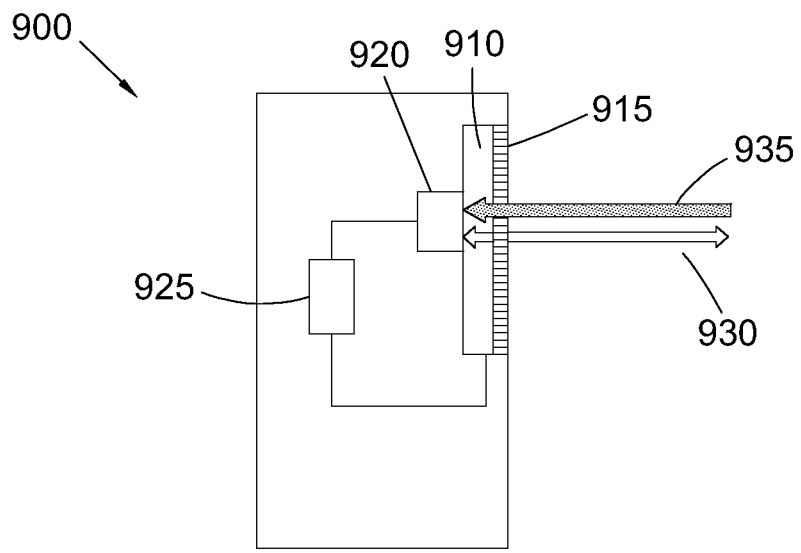
FIG. 9 depicts an example apparatus according to an embodiment of the disclosure, the example apparatus being a smartphone.

FIG. 9 depicts an example apparatus according to an embodiment of the disclosure, the example apparatus being a smartphone 900. It will be appreciated that the disclosed methods, devices and apparatus for determining an ambient radiation intensity are also applicable to other devices, such as portable devices, cellular telephone, tablet devices, televisions, displays, or the like.

The smartphone comprises an RGB display 910. In an example embodiment, the RGB display may be an OLED display. The display comprises a plurality of radiation-emitting elements 915. In the example of FIG. 9, the radiation-emitting elements 915 comprise red, green and blue LEDs. The RGB display 910 is coupled to processing circuitry 925 which may directly or indirectly control a brightness of the RGB display 910.

The smartphone 900 also comprises a radiation-sensitive device 920 according to an embodiment of the disclosure. In some embodiments, the radiation sensitive device 920 may be a device as described above with reference to FIG. 8. The processing circuitry 925 coupled to the radiation-sensitive device 920.

In some embodiments the radiation-sensitive device 920 may be an integrated device. For example, the optical filters, and the processing circuitry 925, and/or at least a portion of the processing circuitry 925, may be integrated into a package, a module such as a multi-chip module, and/or provided as a monolithic device. In some embodiments, the radiation-sensitive device 920 may be provided as a distributed system. That is, at least a portion of the processing circuitry 925 and/or storage such as one or more memory devices associated with the processing circuitry 925, may be located remote from the radiation-sensitive device 920. For example, at least a portion of the processing circuitry 925 may be provided on one or more servers and/or cloud-based devices. At least a portion of the processing circuitry 925 may be provided on a remote console or client device.

As shown in FIG. 9, the radiation sensitive device 920 is disposed behind the display 910. As such, FIG. 9 represents us of the radiation sensitive device 920 in a BOLED application.

The radiation-sensitive device 920 may be configured to sense ambient radiation that propagates through the RGB display 910, as denoted by arrow 935. For example, the RGB display 910 may comprise one or more apertures, or transparent regions to enable ambient radiation to propagate through the RGB display 910. In some embodiments, a layer or coating disposed on a rear of the RGB display 910 may be partially removed to enable ambient radiation to propagate through the RGB display 910 and be incident upon the radiation-sensitive device 920.

The radiation-emitting elements 915 of the RGB display 910 are configured to emit radiation, e.g. display information, predominantly in a direction away from the smartphone 900, as indicated by arrow 930. However, a portion of such radiation may also be incident upon the radiation-sensitive device 920, as indicated by the bidirectional arrow 930.

The processing circuitry 925 may be configured to determine, from an intensity of incident radiation sensed using the one or more sets of optical filters as described above with reference to FIG. 8, and based on the spectrum associated with the radiation-emitting elements 915 of the RGB display, a contribution of ambient radiation 935 to the intensity of incident radiation 930 sensed using the one or more sets of optical filters.

That is, in some embodiment the processing circuitry 925 may be configured to solve the simultaneous equations (1) and (2), and therefore determine parameters 'a' and 'y', for each of the one or more sets of optical filters.

By determining an ambient radiation intensity, e.g. an ambient lux, brightness of the RGB display 910 may be adapted accordingly, to ensure optical viewing by a user of information presented by the RGB display 910.

In some embodiments, the radiation-sensitive device may be, or may comprise, a proximity sensor. FIG. 10 depicts radiation-sensitive device 1000, wherein the radiation-sensitive device 1000 is a proximity sensor 1000 according to an embodiment of the disclosure.

The radiation-sensitive device 1000 comprises a first optical filter 1010 having a first passband spanning a portion of a spectrum associated with an infrared radiation-emitting device 1050 and a portion of an ambient infrared radiation spectrum; and a second optical filter 1015 having a second passband spanning a portion of the spectrum associated with the infrared radiation-emitting device 1050 and a portion of the ambient infrared radiation spectrum, the second passband different to the first passband. In an example embodiment, the first optical filter 1010 and second optical filter 1015 may be implemented as interference filters.

The first optical filter 1010 is associated with a first infrared radiation-sensitive element 1020. In an example embodiment, the first infrared radiation-sensitive element 1020 may comprise one or more photodiodes.

The first optical filter 1010 filters incident infrared radiation, such that the first infrared radiation-sensitive element 1020 receives filtered infrared radiation. In one example embodiment, the passband of the first optical filter 1010 corresponds to a portion of a spectrum of the infrared radiation-emitting device 1050. That is, the passband of the first optical filter 1010 is configured to have a passband substantially overlapping a spectrum of the infrared radiation-emitting device 1050.

The second optical filter 1015 is associated with a second infrared radiation-sensitive element 1025. The second infrared radiation-sensitive element 1025 may comprise one or more photodiodes.

The second optical filter 1015 filters infrared radiation, such that the second infrared radiation-sensitive element 1025 receives filtered infrared radiation. In one example embodiment, the passband of the second optical filter 1015 also corresponds to a portion of a spectrum of the infrared radiation-emitting device 1050. That is, the passband of the second optical filter 1015 is also configured to have a passband substantially overlapping a spectrum of the infrared radiation-emitting device 1050, and wherein the passbands of the first and second optical filters 810, 815 are different.

The infrared radiation-sensitive device 1000 also comprises processing circuitry 1030 configured to determine, from an intensity of incident infrared radiation sensed using the first and second optical filters 1010, 1015 and based on the spectrum associated with the infrared radiation-emitting device 1050, a contribution of ambient infrared radiation to the intensity of incident infrared radiation sensed using the first and second optical filters 1010, 1015.

The first infrared radiation-sensitive element 1020 and the second infrared radiation-sensitive element 1025 are coupled to the processing circuitry 1030. As such, the processing circuitry 1030 may receive data and/or a signal corresponding to infrared radiation sensed by each of the first infrared radiation-sensitive element 1020 and the second infrared radiation-sensitive element 1025.

The processing circuitry 1030 may also be configured to determine the contribution of ambient radiation to the intensity of incident radiation sensed using each of the first set of optical filters 805, the second set of optical filters 835 and the third set of optical filters 865 by solving the equations (1) and (2) to determine 'a' and/or 'y' for each set of filters.

In such an embodiment, the value 'a' may represent an ambient infrared contribution and 'y' may represent the intensity of the infrared radiation-emitting device 1050 in the sensed mixture of radiation.

Such a device may generally used in proximity-sensing applications by configuring the radiation-emitting device 1050 to emit infrared radiation in a direction of a target. One or more radiation-sensitive elements, such as the first radiation-sensitive elements 1020 and second radiation-sensitive element 1025, may detect infrared radiation reflected from the target. An intensity of the reflected radiation may be indicative of a proximity of the target. However, such reflected infrared radiation may be contaminated with ambient infrared radiation, which may result in false alarms and/or missed detection of targets.

Advantageously, such a radiation-sensitive device 1000, when used for proximity sensing, may be well-suited to reducing incidences of false alarms and/or missed detection of targets.

For example, there are at least two conditions that may result in high intensity infrared radiation incident upon the radiation-sensitive device 1000. A first condition may be in bright sunlight with a relatively distant target. In the first condition, the disclosed radiation-sensitive device 1000 may readily identify that a substantial portion of the incident radiation is from ambient infrared radiation, and thus that target is relatively distant, therefore reducing false alarms.

In the second condition, a target may be relatively close to the radiation-sensitive device 1000. In this case, the disclosed radiation-sensitive device 1000 may readily identify that a substantial portion of the incident radiation is reflected radiation from the infrared radiation-emitting device 1050 itself, and thus identify a close target and avoid occurrences of missed target detection.

Figure 11:
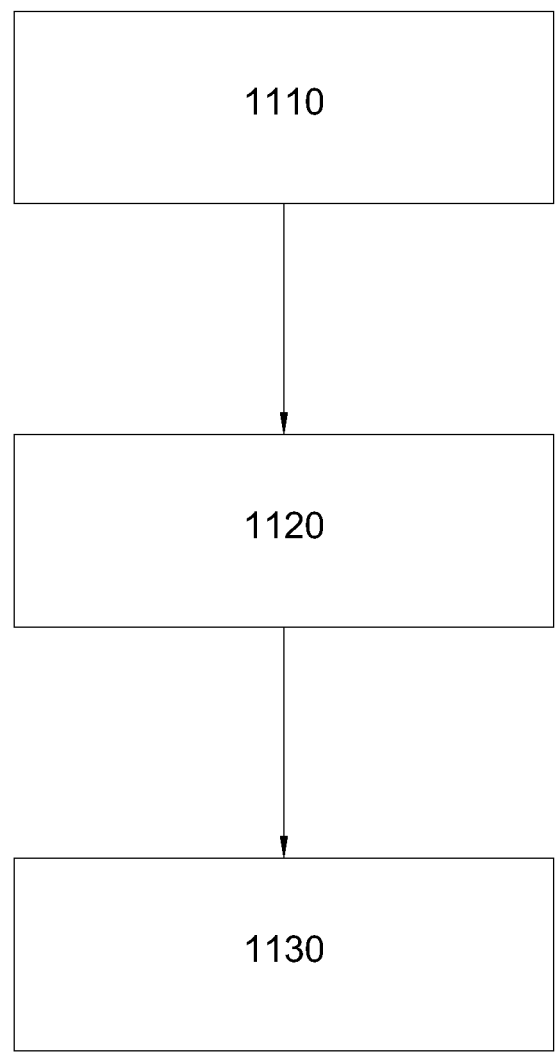
FIG. 11 depicts a method of determining an ambient radiation intensity, according to an embodiment of the disclosure.

FIG. 11 depicts a method of determining an ambient radiation intensity, the method comprises a first step 1110 of sensing an incident radiation using a first optical filter having a first passband spanning a portion of a spectrum associated with a radiation-emitting device and a portion of an ambient radiation spectrum.

The method comprises a second step 1120 of sensing the incident radiation using a second optical filter having a second passband spanning a portion of the spectrum associated with the radiation-emitting device and a portion of the ambient radiation spectrum, the second passband different to the first passband.

It will be appreciated that in some embodiments the first and second steps may occur concurrently, sequentially, and/or in either order.

The method comprises a third step 1130 of determining, from an intensity of incident radiation sensed using the first and second optical filters and based on the spectrum associated with the radiation-emitting device, a contribution of ambient radiation to the intensity of incident radiation sensed using the first and second optical filters.

Although the disclosure has been described in terms of particular embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A radiation-sensitive device for determining an ambient radiation intensity, the device comprising:
   at least one set of optical filters comprising:
      a first optical filter having a first passband spanning a portion of a spectrum associated with a radiation-emitting device and a portion of an ambient radiation spectrum;
      a second optical filter having a second passband spanning a portion of the spectrum associated with the radiation-emitting device and a portion of the ambient radiation spectrum, the second passband different to the first passband; and
   processing circuitry configured to determine, from an intensity of incident radiation sensed using the first and second optical filters and based on the spectrum associated with the radiation-emitting device, a contribution of ambient radiation to the intensity of incident radiation sensed using the first and second optical filters by solving the following simultaneous equations to determine 'a' and/or 'y':

$$O_{F1}=n_1*a+Y_1*y$$

$$O_{F2}=n_2*a+Y_2*y$$

wherein:
   'a' corresponds to the ambient radiation intensity per unit wavelength in the vicinity of the first and second passbands;
   'y' corresponds to an integral of the spectrum associated with the radiation-emitting device;
   $O_{F1}$ corresponds to radiation sensed using the first optical filter;
   $O_{F2}$ corresponds to radiation sensed using the second optical filter;
   $n_1$ corresponds to a wavelength-range of the first passband;
   $n_2$ corresponds to a wavelength-range of the second passband;
   $Y_1$ corresponds to a proportion of y corresponding to the first passband; and
   $Y_2$ corresponds to a proportion of y corresponding to the second passband.

2. The radiation-sensitive device of claim 1 comprising a third optical filter corresponding to a photopic luminosity function, wherein the determination of the contribution of ambient radiation comprises subtracting, from an intensity of incident radiation sensed using the third optical filter, a determined radiation contribution from the radiation-emitting device.

3. The radiation-sensitive device of claim 2 wherein the determined radiation contribution from the radiation-emitting device corresponds to a product of the photopic luminosity function and the spectrum associated with the radiation-emitting device.

4. The radiation-sensitive device of claim 1, wherein a/the wavelength-range of the first passband substantially overlaps a/the wavelength-range of the second passband.

5. The radiation-sensitive device of claim 1, wherein the at least one set of optical filters comprises at least one of:
   a set of filters associated with a green LED;
   a set of filters associated with a red LED;
   a set of filters associated with a blue LED; and/or
   a set of filters associated with an infrared radiation source.

6. The radiation-sensitive device of claim 1 comprising a plurality of sets of optical filters, each set being associated with a different radiation-emitting device, and wherein the processing circuitry is configured to determine the contribution of ambient radiation to the intensity of incident radiation sensed corresponding to each of the different radiation-emitting devices.

7. The radiation-sensitive device of claim 1 wherein the determined ambient radiation intensity is a visible and/or infrared ambient radiation intensity.

8. An apparatus comprising:
   a radiation-sensitive device according to claim 1;
   at least one radiation-emitting device.

9. The apparatus of claim 8, wherein the at least one radiation-emitting device forms a component of an OLED display, and wherein the radiation-sensitive device is disposed behind the OLED display and configured to detect radiation through the OLED display.

10. The apparatus of claim 9, wherein the OLED display (910) comprises a red, a green and a blue OLED, and wherein the at least one radiation-sensitive device comprises: a set of optical filters associated with the red LED; a set of optical filters associated with the green LED; and a set of optical filters associated with the blue LED.

11. The apparatus of claim 9 comprising a camera, wherein the processing circuitry is configured to white-balance and/or adjust a brightness of an image captured by the camera based at least in part upon a determined ambient radiation intensity.

12. A proximity sensor comprising:
   a radiation-sensitive device according to claim 1;
   at least one infrared radiation-emitting device.

13. A cellular telephone, a smartphone, a tablet device, a laptop, or a portable device comprising the apparatus of claim 8.

14. A method of determining an ambient radiation intensity, the method comprising:
   sensing an incident radiation using a first optical filter having a first passband spanning a portion of a spectrum associated with a radiation-emitting device and a portion of an ambient radiation spectrum;
   sensing the incident radiation using a second optical filter having a second passband spanning a portion of the spectrum associated with the radiation-emitting device and a portion of the ambient radiation spectrum, the second passband different to the first passband; and
   determining, from an intensity of incident radiation sensed using the first and second optical filters and based on the spectrum associated with the radiation-emitting device, a contribution of ambient radiation to the intensity of incident radiation sensed using the first and second optical filters by solving the following simultaneous equations to determine 'a' and/or 'y':

$$O_{F1}=n_1*a+Y_1*y$$

$$O_{F2}=n_2*a+Y_2*y$$

wherein:
   'a' corresponds to the ambient radiation intensity per unit wavelength in the vicinity of the first and second passbands;
   'y' corresponds to an integral of the spectrum associated with the radiation-emitting device;
   $O_{F1}$ corresponds to radiation sensed using the first optical filter;
   $O_{F2}$ corresponds to radiation sensed using the second optical filter;

$n_1$ corresponds to a wavelength-range of the first passband;

$n_2$ corresponds to a wavelength-range of the second passband;

$Y_1$ corresponds to a proportion of y corresponding to the first passband; and $Y_2$ corresponds to a proportion of y corresponding to the second passband.

* * * * *